UNITED STATES PATENT OFFICE.

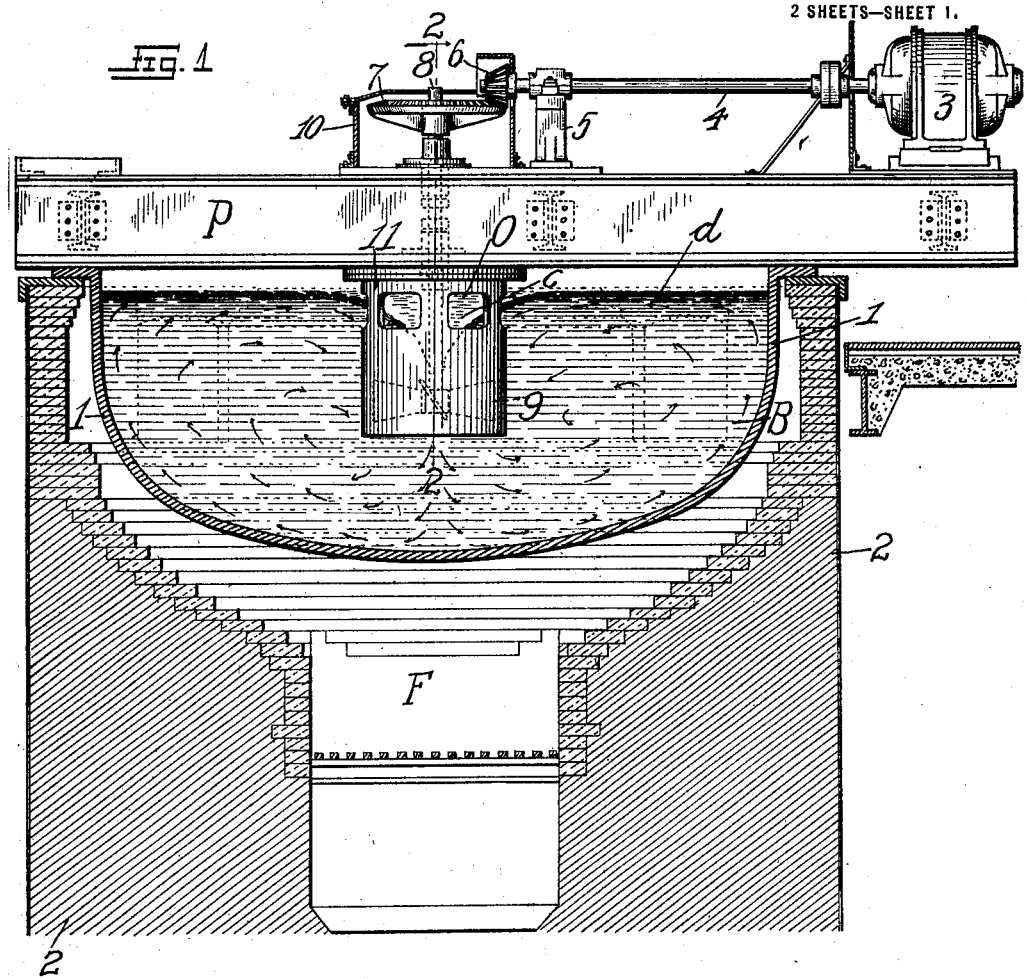
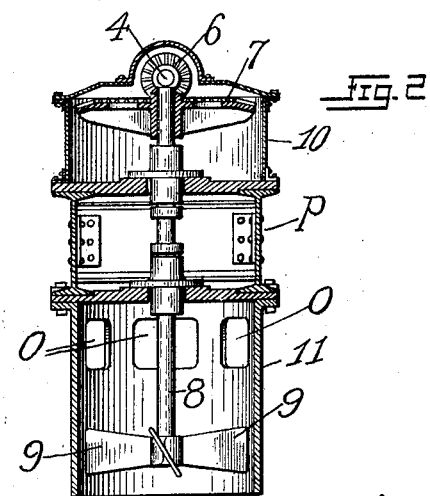

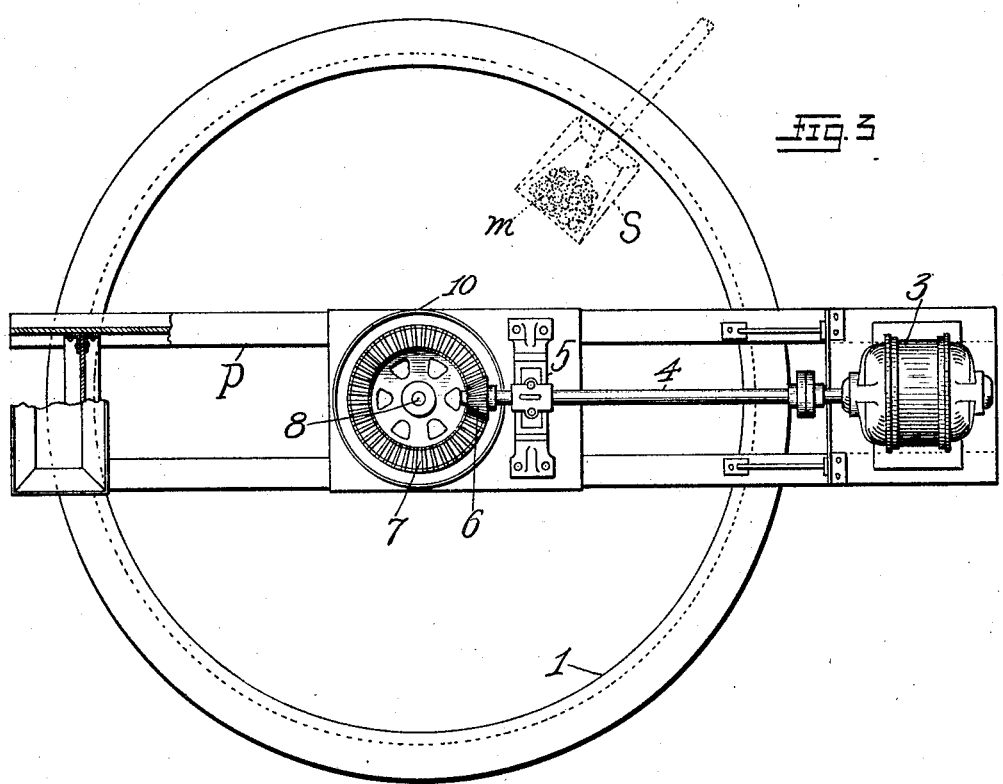
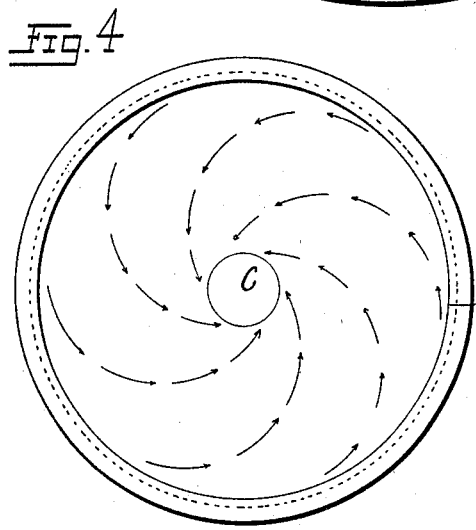
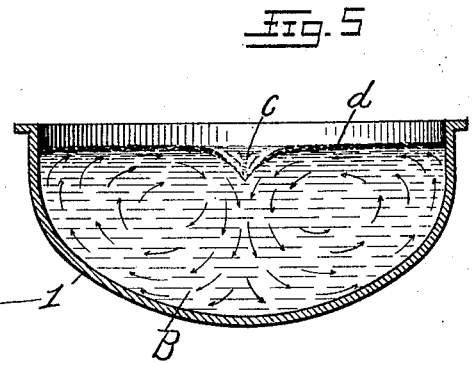

GEORGE P. HULST, OF HAMMOND, INDIANA, AND MILO W. KREJČI, OF CHICAGO, ILLINOIS.

PROCESS OF TREATING LEAD BULLION.

1,386,503.      Specification of Letters Patent.      Patented Aug. 2, 1921.

Application filed February 16, 1920. Serial No. 359,069.

*To all whom it may concern:*

Be it known that we, GEORGE P. HULST, and MILO W. KREJČI, citizens of the United States, residing, respectively, at Hammond, in the county of Lake, State of Indiana, and at Chicago, in the county of Cook, State of Illinois, have invented certain new and useful Improvements in Processes of Treating Lead Bullion, of which the following is a full, clear, and exact description, reference being had to the accompanying drawings, forming a part hereof.

The present invention is directed to the refining or purification of lead bullion, particularly in connection with the well known Parkes' process of desilverization. It may be considered as an improvement on the process forming the subject-matter of U. S. Patent No. 1,285,714 bearing date Nov. 26, 1918, issued to George P. Hulst, process of treating lead bullion, the object herein sought being, among other things, to cut out the softening and preheating furnaces made indispensable in the patented process; to reduce the amount of material treated at the retort and cupels, through the higher concentration of silver in the zinc skim from the desilverizing kettles; to reduce the amount of zinc involved in the desilverizing operation; to secure a richer copper dross from the treatment or drossing kettle for the residue furnace; to eliminate practically, the formation of copper litharge in the cupel furnace; to eliminate the formation of copper skim in the desilverizing kettle; and finally, to simplify the process as a whole whereby a material saving in the cost of production results. Generically, the invention contemplates the incorporation into, and diffusion through, a bath of molten bullion maintained at proper temperature, of a suitable reagent (or reagents) having sufficient affinity for the various impurities (copper, arsenic, tellurium, selenium, antimony, bismuth) contained therein, to segregate the same from the lead and bring them to the surface of the bath in the form of a dross that may be skimmed off, leaving the lead in a pure condition for subsequent desilverization. The reagents in the main relied on for this purpose are sulfur, the sulfids and sulfates of the alkali metals (or their equivalents), the hydrates and carbonates of the alkali metals (or their equivalents), and lead oxid (PbO derived from refiner skim, molding skim, Pattinson skim or from any other suitable source) in conjunction with sulfur or any suitable sulfur bearing compound having a drossing action on the copper content of the lead. The character of the dross formed by the addition of the respective reagents to the lead bath will obviously depend on the nature and relative quantities of the impurities present in the lead; and while impurities such as arsenic, tellurium, selenium, and antimony may be drossed out by means of the aforesaid alkali hydrates or carbonates, and arsenic and antimony may be drossed out by means of lead oxid; yet, unless we add sulfur or some sulfur bearing compound to the bath, the copper will remain behind, except such portions as ordinarily dross out by liquation as practised in the art, this drossing being materially assisted by the sulfur which is usually present in small quantities in base bullion. Since copper is perhaps the most objectionable element to contend with in the desilverizing operation, it follows that under our improvement resort must be had to sulfur or sodium sulfid or sulfate (or their equivalents) to rid the lead of its copper before desilverization is attempted, the addition of the sulfur reagent being necessary even though use be made of some of the other compounds (the hydrates or carbonates of the alkali metals, or the oxid of lead) for the elimination of impurities other than copper. Sulfur has the capacity of drossing copper, arsenic, selenium, and tellurium, the sulfid or sulfate of sodium drossing in addition the antimony. Precisely what reactions between the drossing reagents and the impurities in the lead take place, and what the exact compositions of the various drosses are we are not prepared to say; neither is it important that we know. The fact is that when these reagents or any of them are used and applied as hereinafter described they dross the impurities out of the bullion. When sulfur alone or uncombined is added to the hot lead the dross formed thereby is probably a mixed arsenid, tellurid, selenid and sulfid of copper; when sodium sulfid or sulfate is added to the bath the dross is probably a mixture of arsenid, tellurid, selenid, and sulfid of copper, and arsenate, tellurate, selenate, and antimonate of sodium, it being remembered that sulfur uncombined will not dross the antimony, whereas a sulfid or sulfate of sodium will; when a hydrate or carbonate of an alkali (such as soda or potash) is added to the bath the dross is probably a mixture of arsenate, tellurate, selenate, and antimonate of sodium or potassium depending on which alkali metal is used; when lead oxid (PbO) such as that furnished by refiner skim, molding skim, or Pattinson skim, is added to the bath, the arsenic and antimony are drossed probably in the form of a mixed arsenate and antimonate of lead; also some copper dross in the form of copper sulfid will appear on account of the small quantities of sulfur usually present in lead bullion. Lead oxid may be conveniently employed in conjunction with sulfur because while sulfur will not dross the antimony, the lead oxid will, the result being substantially that obtained with the use of an alkali metal sulfid or sulfate which, as previously pointed out drosses not only the copper, arsenic, tellurium, and selenium but the antimony (and arsenic) as well. Of course, with all these drosses there will always be mixed some lead probably in the form of oxid by reason of the incidental oxidation which necessarily results during the incorporation of the reagents into the hot bath of metal. Nothing has been said about bismuth; but since this does not materially affect the desilverizing operation, and since it is doubtful that any material drossing of this metal results from the addition of any reagent here used, we may dismiss this element from further consideration, allowing it to be disposed of in the final refining operation by any suitable method known in the art. We do not wish to be understood that the formation of dross is due to the addition to the lead bath of any of the reagents above mentioned, it being well known that dross carrying various impurities is formed in the liquation of lead bullion in the Parkes' process, and that certain impurities in the form of a skim rise to the surface of the lead bath in the oxidizing step of the softening operation. The same is true of the process described in the Hulst patent aforesaid. The novelty of our invention does not reside in the formation of dross, but in the process by which the impurities in the form of dross are practically entirely eliminated from the lead, leaving the latter in the best possible shape for desilverization. By the process described in the Hulst patent aforesaid, it was considered quite an accomplishment to bring the copper content in the liquating kettle down to .05%. As an example of what can be accomplished by our improvement may be cited the fact that in one case where an assay of the bullion before treatment showed .164% of copper, an assay after treatment showed that the copper had been reduced to .0008% (eight ten-thousandths of one per cent.), the arsenic being reduced from .081% to .026%. In another instance the copper was reduced from .047% to .0008%, and the arsenic from .031% to .017%. When we consider that the copper may thus be practically entirely eliminated in the liquating or drossing kettle, thereby dispensing with the softening furnace and the preheating furnace, and thus reducing the cost per ton of bullion treated, the value of our improvement will be appreciated. In practice, the reagents are added to the charge of bullion in proportions conforming substantially to their combining weights. For example, if using sulfur, about two hundred (200) pounds of the sulfur preferably in powdered form are added to a bath of ninety-five to one hundred tons of molten lead, this being sufficient to dross the copper out of the bullion (probably in the form of a copper sulfid). The weight of sulfur added to the bullion is approximately one-tenth of one per cent. of the weight of the bullion. On the other hand, where sodium sulfid ($Na_2S$) is used, there, considerably more must be added to dross the copper on account of the lower quantity of sulfur present in the sulfid, it being remembered that the sodium element probably combines with the arsenic, tellurium, selenium and antimony to form the arsenates, tellurates, selenates and antimonates of sodium. By assaying the base bullion before treatment, the expert metallurgist can determine the approximate amount of reagent or reagents to be added. To insure the results here outlined, the reagents must be thoroughly incorporated into and diffused through the molten charge of bullion, and in such manner as to impregnate the entire mass of lead. The matter of temperature, and the pressure involved in the method of diffusing the reagent through the mass (lead bath) are controlling, because on these depends the success of our process; and while not wishing to restrict ourselves to any one apparatus for carrying on the process, that here shown has been found eminently satisfactory in practice. The same comprises a stirring machine which may be deposited over any drossing kettle in which the lead is liquated, the metal being so stirred during the feeding of the reagents thereto, as to bring about the necessary diffusion of the reagents through the bath, and the thorough impregnation of the bath thereby, during which time the temperature as hereinafter explained must be kept under control. The details of the invention will now be described in connection with the accompanying drawings in which—

Figure 1 represents a vertical middle section of a drossing and desilverizing kettle showing the stirrer for the lead in operative position, the stirrer being in side elevation; Fig. 2 is a vertical transverse section of the stirrer on the line 2—2 of Fig. 1; Fig. 3 is a top plan of Fig. 1, with parts broken away; Fig. 4 is a diagrammatic top plan of the kettle showing the horizontal rotary movement imparted to the metal when stirred; and Fig. 5 is a middle vertical section through the kettle showing diagrammatically the vertical radial circulation of the metal when stirred.

Referring to the drawings, 1 represents a conventional desilverizing kettle, 2 the brick work on which the same is supported, and F the fire place within the brick work as well understood in the art. In the present embodiment of our invention the reagents added to the molten metal or bullion B for the purpose of drossing the impurities, are incorporated into the lead and caused to be diffused therethrough by means of a stirring apparatus deposited over the kettle, this apparatus comprising a frame or platform P built up of I-beams or equivalent structural members suitably tied and braced, one end of the platform supporting a preferably electric motor 3, the shaft 4 whereof is supported at its outer end by a post or bearing 5 approximately at the center of the platform, the shaft terminating in a bevel pinion 6 meshing with a bevel gear wheel 7 at the upper end of a vertical stirrer shaft 8 carried by the platform, the shaft being provided at its lower end with suitable radiating stirrer blades or arms 9. The gears 6 and 7 are preferably protected by a casing 10, a suitable cylindrical casing 11 secured to the platform P likewise protecting the stirrer shaft and its blades. The casing 11 is open at the bottom, and near the top the same is provided with peripheral openings O for the free circulation of the molten metal.

In the practical operation of the process, the bullion B in the drossing kettle 1 is first heated to approximately 700 degrees Fahrenheit or somewhat above the melting point of lead, and when this point has been reached the frame or platform P (which travels on a track overhead) is deposited over the kettle as shown, the motor 3 is started and rotation (counter-clockwise in the present example) is imparted to the stirrer shaft 8 and its blades 9. The rotation of the stirrer mechanism imparts to the molten mass of metal a horizontal vortical movement or whirl, the core c of the vortex being concentric with the axis of rotation of the stirrer shaft 8. During the stirring of the hot metal the drossing agent m (sulfur or its equivalent) is thrown on top of the bath from a shovel S (Fig. 3) in the hands of the operator, or otherwise, and as the sulfur strikes the surface of the bath it participates in the rotary circulation or motion imparted to the metal and at the same time is drawn through the openings O toward the core c of the vortex, being sucked down into the body of the mass of metal; and with the pressure of the superincumbent metal upon them the sulfur particles circulate radially in vertical planes from and toward the axis of the vortex, the entire mass of metal with the drossing reagent diffused through it rotating in a horizontal plane and at the same time circulating in vertical radial planes as fully indicated by the arrows in Figs. 4 and 5. The drossing agent reacting with the impurities in the lead drosses the same, the dross d appearing on the surface of the bath from which it is subsequently skimmed. The stirring at the temperature aforesaid (700 degrees Fahrenheit) is continued for a period of say fifteen minutes, the dross at the conclusion of this interval being entirely skimmed off. The temperature of the bath is then lowered say to about 660 degrees Fahrenheit, this lowering of temperature or cooling being accomplished either by adding more bullion or cold lead, or by blowing atmospheric air, steam, gas or water through the bath by means of a pipe in the hands of the operator, or in any other manner known to the art. This lowering of the temperature allows any copper which remains behind to rise to the surface as a dross (probably as copper sulfid) which is skimmed off in the usual way and added to the first skimmings. After this more sulfur (or other drossing reagent) is added to the bath while the same is being stirred and the resulting dross again skimmed and added to the previous skimmings. After this the bath is still further cooled to a point where the lead begins to freeze and any final dross appearing is skimmed off. During the skimming of the drosses the stirrer may or may not be stopped. From the standpoint of economy the better practice would be to stop the stirrer while skimming. After the final cooling and skimming, the bath is heated up to a point slightly above the melting point of zinc (any dross appearing being skimmed off) and zinc added and stirred into the charge in the usual way for purpose of desilverization of the bullion. The dross removed by the several skimming operations is subsequently heated in a kettle so as to melt the lead, and subjected to pressure by any form of press lowered into the kettle, the lead in the pressing operation being squeezed out and treated over again, the dry dross being charged into the residue furnace the same as in the process of the Hulst patent aforesaid. In fact, the refining operation under our improvement is similar to that practised under the Hulst patent, except that by our method of drossing we dispense with the softening and preheating furnaces of the patented process, and it may be said that we likewise dispense with the liquating kettle therein referred to, the drossing by our method being carried on in the desilverizing kettle to the purified bullion in which the zinc is directly added at the conclusion of the drossing operation. Of course, by the substantially complete elimination of the copper from the bullion under our improved method there remains only a negligible quantity of copper in the kettle when the zinc is added so that the copper skim therefrom returned to the residue furnace is reduced to the minimum. For the same reason little or no copper litharge will make its appearance in the cupel furnace under our improved method of treatment. There being practically no copper in the desilverizing kettle when the zinc is added, it follows that a less amount of zinc need be used under our improvement than was the case with the patented process; so too, the copper drosses charged from the kettle to the residue furnace are necessarily richer than the drosses from the liquating kettle in the patented process. In said process the refiner skim, molding skim and Pattinson skim were employed as oxidizing agents in the softening furnace. These skims are in the main an oxid of lead, and may still be employed under our improvement for drossing the antimony should any be present in the bullion, in which event this oxid of lead could be added to the bath in proper proportions in conjunction with the sulfur component which drosses the copper and other impurities, the combined dross being charged into the residue furnace. If the bullion contains no antimony or only a negligible amount, these lead oxid skims may be turned directly into the residue furnace the same as in the conventional Parkes' process. Under our improvement the dross bullion from the residue furnace is returned into the drossing kettle (the same as it is returned in the Hulst patent to the liquating kettle), the matte going to the crusher, and the antimony slag to the blast furnace, the same as in the patented process.

The stirring apparatus here shown and described for incorporating the drossing reagent (or reagents) into the molten bath, and causing the diffusion thereof throughout the molecules of the molten metal, is only by way of example. The same result might be brought about by other means. For example, the reagent (sulfur, or its equivalent) in powdered form might be blown into the body of the molten metal below the surface thereof by means of an inert gas such as carbon dioxid or nitrogen (so as not to burn the sulfur), in pretty much the same way as a charge is blown in a converter, this method being understood by those skilled in the art and requiring no illustration. To secure the desired incorporation and diffusion of the reagent the element of pressure is more or less controlling. For example, in the case of the stirrer apparatus here shown, as the particles of sulfur are drawn by the vortex into the body of the molten mass the same are caused to circulate therethrough while subjected to the pressure of the superincumbent body of metal (see arrows Fig. 5). Were the sulfur blown into the charge of molten metal the pressure encountered thereby as it was forced through the metal would be akin to that brought about by the stirring operation of the apparatus herein illustrated. Any method by which the reagent was mechanically projected into or caused to permeate the molten mass and become thoroughly diffused therethrough would come within the scope of our invention, the object sought in all cases being to effect the incorporation and diffusion in such a way as not to subject the reagent to oxidation before it has had a chance to react with the impurities to form dross. With our present stirrer, it is true that as the sulfur is being fed to the bath some of it (a very small fraction) takes fire and is converted into gas ($SO_2$), which escapes, but this quantity is quite negligible. In the present example we show the sulfur as being thrown into the bath by a shovel in the hands of the operator, but any form of mechanical feed may be substituted. In fact we may provide the stirrer with a feed attachment for the sulfur (or other reagent) to design which would fall within the purview of the skilled mechanic.

It was pointed out above that the temperature at which the initial drossing in the kettle is practised should be approximately 700 degrees Fahrenheit. This of course is above the melting point of lead but considerably below the melting point of copper. The reason for this temperature is, that were the metal made any hotter there would be danger of a part of the copper remaining behind in the bath, the object sought being to maintain the temperature comparatively low so as to insure the complete segregation of the copper in the form of dross (whose melting point is higher than that of the lead). After the first drossing the temperature is progressively reduced until all the copper is eliminated as previously described. Any reagents that operate as chemical equivalents of those here mentioned are necessarily included within the scope of our invention. Again, the process need not necessarily be restricted to the treatment of base bullion as it leaves the blast furnace, but may be applied to bullion which has subsequently been softened but from which the copper has not been completely removed.

Having described our invention what we claim is:

1. In the treatment of lead bullion, the process which consists in subjecting a bath of molten lead to agitation, and simultaneously feeding thereto without oxidation a suitable reagent operating to segregate therefrom the impurities in the form of dross.

2. In the treatment of lead bullion, the process which consists in subjecting to agitation a bath of molten lead maintained at a temperature below the melting point of copper, and simultaneously feeding thereto a suitable reagent operating to segregate therefrom the impurities in the form of dross.

3. In the treatment of lead bullion, the processs which consists in subjecting to agitation a bath of molten lead maintained at a temperature above its melting point and below the melting point of copper, and simultaneously subjecting said bath to the action of a reagent carrying sulfur operating to segregate therefrom the impurities in the form of dross.

4. In the treatment of lead bullion, the process which consists in subjecting a bath of lead maintained at a temperature below the melting point of copper, to the action of sulfur reacting with the impurities in the lead below the surface of the bath whereby said impurities are drossed and caused to rise to the surface.

5. In the treatment of lead bullion, the process which consists in melting a charge of lead and maintaining the temperature thereof below the melting point of copper, and diffusing through the mass a sulfur carrrying reagent whereby the impurities are drossed and caused to rise to the surface of the bath, then removing said dross.

6. In the treatment of lead bullion, the process which consists in melting a charge of lead and maintaining the same at a temperature of substantially 700 degrees Fahrenheit, causing a diffusion through the mass, of a sulfur carrying reagent for drossing out the impurities, removing the dross, reducing the temperature of the bath to cause any copper remaining behind to rise to the surface as a dross, removing said dross, repeating the diffusion through the mass of a sulfur carrying reagent at such reduced temperature, removing the resulting dross, then again further reducing the temperature until the freezing point of lead is approached, then finally heating the lead to bring the bath to proper temperature for desilverization and at the same time skimming off any dross floating on the surface of the bath.

7. In the treatment of lead bullion, the process which consists in subjecting a bath of molten lead to vortical rotation about a vertical axis and simultaneously causing a radial circulation of the molecules to and from said axis, feeding to the surface of said bath a drossing reagent whereby the same is drawn into the core of the vortex and then caused to pass into the mass of the lead by the radial circulation of the molecules as aforesaid, thereby permeating the mass and reacting with the impurities to form a dross which rises to the surface of the bath around the core of the vortex, and finally removing the dross.

8. In the treatment of lead bullion, the process which consists in diffusing through a charge of the molten metal a suitable reagent to dross the copper content of the charge, maintaining the temperature of the bath below the point of fusion of the copper, then removing the dross.

9. In the treatment of lead bullion, the process which consists in diffusing below the surface of a charge of the molten metal a sulfur carrying reagent reacting with the copper content of the charge to form a copper dross, maintaining the temperature of the bath above the melting point of lead but below the melting point of copper, skimming the dross, then cooling the bath to clear the same of the balance of the copper in the form of dross, and removing the second layer of dross.

10. In the treatment of lead bullion, the process which consists in forming a bath of molten lead, incorporating a drossing reagent into the mass by agitation of the mass, and finally skimming the resulting dross.

11. In the treatment of lead bullion, the process which consists in forming a bath of molten lead, causing a drossing reagent to penetrate the mass below the surface of the bath, and skimming the resulting dross.

12. In the treatment of lead bullion, the process which consists in forming a bath of molten lead, causing a sulfur reagent to penetrate the mass below the surface of the bath, and finally removing the resulting dross.

13. In the treatment of lead bullion, the process which consists in forming a bath of molten lead and maintaining the same at a temperature between the melting points of lead and copper, causing a drossing reagent to be diffused through the mass by pressure exerted against the molecules of the mass, whereby impregnation of the lead by the reagent results and the impurities thereof are expelled in the form of dross which rises to the surface of the bath, then removing the dross.

14. In the treatment of lead bullion, the process which consists in forming a bath of molten lead, agitating the mass, and simultaneously introducing thereinto at a point beneath the surface thereof a reagent operating to dross the impurities.

15. In the treatment of lead bullion, the process which consists in forming a bath of the molten metal, and causing a suitable reagent to diffuse itself while subjected to the pressure of the mass, through the mass, thereby segregating the impurities from the lead in the form of dross.

16. In the treatment of lead bullion, the process which consists in forming a bath of the molten metal, and introducing into the bath against the pressure exerted by the molecules thereof a suitable sulfur reagent whereby the reagent thoroughly impregnates the mass and combines with the impurities to form a dross, then removing the dross.

17. In the treatment of lead bullion, the process which consists in forming a bath of the molten metal, then forcibly introducing between the molecules of the mass a suitable sulfur or equivalent reagent to combine with the impurities to form a dross, then removing said dross.

18. In the treatment of lead bullion, the process which consists in subjecting a bath of the molten metal to the action of a suitable reagent caused to permeate the mass of metal and react with the impurities thereof to form a dross which is removable from the surface of the bath.

In testimony whereof we affix our signatures respectively at Hammond, county of Lake, State of Indiana, the 7th day of February 1920, and at Cleveland, county of Cuyahoga, State of Ohio, the 11th day of February, 1920.

GEORGE P. HULST.
MILO W. KREJČI.